United States Patent
Schlecht et al.

(10) Patent No.: US 6,776,211 B2
(45) Date of Patent: Aug. 17, 2004

(54) WINDOW SHADE FOR CURVED OR NON-RECTANGULAR VEHICLE WINDOWS

(75) Inventors: Werner P. Schlecht, Vaihingen/Enz (DE); Herbert Walter, Ebersbach (DE)

(73) Assignee: BOS GmbH & Co. KG, Ostfildern (DE)

( * ) Notice: Subject to any disclaimer, the term of this patent is extended or adjusted under 35 U.S.C. 154(b) by 0 days.

(21) Appl. No.: 09/955,514

(22) Filed: Sep. 18, 2001

(65) Prior Publication Data

US 2002/0033244 A1 Mar. 21, 2002

(30) Foreign Application Priority Data

Sep. 19, 2000 (DE) .......................................... 100 46 553

(51) Int. Cl.[7] .................................................. B60J 3/02
(52) U.S. Cl. .................................. 160/370.22; 160/120
(58) Field of Search ........................... 160/370.22, 120, 160/122, 241, 262, 273.1, 310; 296/97.7, 97.8, 97.2

(56) References Cited

U.S. PATENT DOCUMENTS

| | | | | |
|---|---|---|---|---|
| 1,882,982 A | * | 10/1932 | Schmiedeskamp ....... | 160/273.1 |
| 2,139,580 A | * | 12/1938 | Draper et al. ................ | 160/120 |
| 3,017,927 A | * | 1/1962 | Demko ..................... | 160/273.1 |
| 3,075,805 A | * | 1/1963 | Golde et al. ................ | 160/120 |
| 3,092,174 A | * | 6/1963 | Winn .......................... | 160/262 |
| 3,389,738 A | * | 6/1968 | Roth .......................... | 160/120 |
| 4,231,411 A | * | 11/1980 | Hehl et al. ................... | 160/120 |
| 4,335,773 A | * | 6/1982 | Masi ........................... | 160/120 |
| 4,874,026 A | * | 10/1989 | Worrall .................. | 160/370.22 |
| 5,201,810 A | * | 4/1993 | Ojima et al. ............ | 160/370.22 |
| 5,551,744 A | | 9/1996 | Liao | |
| 5,560,668 A | * | 10/1996 | Li .......................... | 160/370.22 |
| 5,860,466 A | | 1/1999 | Kao | |
| 6,079,474 A | | 6/2000 | Lin | |
| 6,186,587 B1 | * | 2/2001 | Entenmann ........ | 160/370.22 X |

FOREIGN PATENT DOCUMENTS

| | | |
|---|---|---|
| DE | 34 27 772 A1 | 2/1986 |
| DE | 295 11693 U1 | 9/1995 |
| DE | 195 31 587 A1 | 3/1997 |
| DE | 197 41 863 A1 | 4/1999 |
| DE | 299 16 739 U1 | 2/2000 |
| EP | 0 240 747 A2 | 10/1987 |
| EP | 0 945 292 A2 | 9/1999 |
| GB | G 93 07 028.4 U1 | 9/1993 |
| GB | G 94 16 744.3 U1 | 6/1995 |

* cited by examiner

Primary Examiner—David M. Purol
(74) Attorney, Agent, or Firm—Leydig, Voit & Mayer, Ltd.

(57) ABSTRACT

A window shade for motor vehicles has a window shade web material 14 which is designed for being adapted during retraction and extension to the shape of the window, namely in respect to the width dimensions and/or in respect to the curvature. To this end, the window shade web material 14 is made either from a window shade web which can be expanded or stretched in the transverse direction, or from two or more non-expandable window shade webs 15 and 16 which, in the extended state, approximate the shape of the respective window in the desired manner. An additional mounting frame 65 can be used in all cases, in which the elements which are parts of the window shade are arranged, or stored, in order to create a component in this way, which can be installed as a whole in the vehicle on the assembly line.

22 Claims, 10 Drawing Sheets

WINDOW SHADE FOR CURVED OR NON-RECTANGULAR VEHICLE WINDOWS

FIELD OF THE INVENTION

The present invention relates generally to window shades for automobile windows, and more particularly, to extendable and retractable automobile window shades.

BACKGROUND OF THE INVENTION

It is known to employ window shades for protecting the interior of motor vehicles against strong solar radiation. The type of window shades most used so far are the so-called rear window shades. Such a rear window shade is described in EP 87 103 302.3.

The known rear window shade has a base, in which a windup roller is rotatably seated. The windup roller is elastically prestressed in the winding direction of a window shade web with the aid of a spring drive.

One transverse edge of the window shade web is fastened on the windup roller, and its other transverse edge is connected with a pull rod. Next to the windup roller, two pivot levers, which are pivotable around shafts which extend at right angles to the windup roller, act on the pull rod. The pivot levers have flexural strength in a vertical direction in respect to the plane defined by the extended window shade web and in the extended state have the function of keeping the pull rod pressed against the window, or of unrolling the window shade web from the windup roller against the force of the spring drive.

The window shade web of the known rear window shade has a trapezoidal shape, which approaches the complicated shape of the rear window. It is intended by means of this to provide as satisfactory a shading as possible, in that only small areas of the rear window remain unshaded by the window shade.

However, because of its structure, the extended window shade web always forms a plane which extends in the form of chord in front of the usually greatly curved rear window. Since the rear windows of sedans can curve considerably with respect to several axes, the extended rear window shade extends relatively far into the passenger compartment.

It is furthermore known to turn the pivot levers supporting the pull rod around their longitudinal axis at the end of the pivot movement when the window shade web is extended. The pull rod is slightly curved in a parabolic shape by this, so that the window shade web is curved in the same way at the immediate connection with the pull rod. But the windup roller remains straight, so that, starting with the curved shape in the vicinity of the pull rod, the window shade web makes a transition into a level or straight shape at the outlet slit.

Finally, it is known from the prior art to guide the front edge of rear window shades by means of a pull rod, whose ends run in two guide rails. In the latter case, too, the extended window shade web forms a plane, whose edges only approximately follow the curved contour of the window.

Another disadvantage of this solution furthermore lies in that the guide rails and the other drive mechanisms for the window shade must be separately installed in the vehicle.

In this case the conditions are particularly disadvantageous if the window shade web is housed in the vehicle roof. The rear window has the narrowest width at the top edge. The shape needs to be matched to this width, so that with the shade extended, large triangular areas, which are not covered, remain in the lower area.

OBJECTS AND SUMMARY OF THE INVENTION

In view of the foregoing, it is the object of the invention to provide a window shade in particular for motor vehicles, which offers improved user comfort and/or installation ease.

An improved user comfort and a better design can be achieved, if the window can be shaded exactly up to the edges when the window shade is extended. To achieve this, a window shade material which can be changed in width is used in accordance with the invention. The width extension here is the direction which lies transversely in respect to the movement direction when the window shade means are retracted or extended. Because of the width adjustment it becomes possible to practically completely fill the window opening, even in the case where the lateral edges of the window do not extend parallel, but are curved or divergent, or if the window shade web is stowed in an area which only permits a short outlet slit.

By "changeable in width", a window shade material is understood here to be designed in such a way that two arbitrary points on the longitudinal edge which are located at the same height experience a relative distance change during retraction and extension.

The window shade material of the window shade in accordance with the invention can be made from a material which is only changeable in width, while it is practically non-expandable in a longitudinal direction, i.e. parallel with the movement path.

Foils which have the desired elastic properties may be used for the window web material, for example foils made from an elastomer. Here it is possible in case the material blocks too much light to improve the entry of light by perforating the foil.

Another possibility of producing the window shade web lies in the use of mesh material, i.e. knit fabrics. As known in connection with clothing, such materials can be expanded in the longitudinal, as well as in the transverse direction. If expandability in the longitudinal direction is undesired, the knit fabric can additionally be provided with non-expandable threads in the longitudinal direction.

The restoring force in transverse expansion is improved if the mesh material is knit from non-expandable threads and elastically expandable threads, for example Elastan™. The material can be produced in the form of plated material. The Elastan™ thread lies only on one side and is not directly exposed to UV light.

A satisfactory adaptation to the respective shape of the window can also be achieved if the window shade material is composed of at least two window shade webs. Moreover, the use of two or more window shade webs has the advantage that the curved, or bowed, shape of the respective window can take an approximated polygon-like shape by means of flat sections which are defined by the extended window shade webs.

By means of this it becomes possible to move the windup rollers for the window shade webs close to the respective edge, for example the bottom edge of the rear window. In this way the rear window shelf behind the rear seat back retains a large surface suitable for placing objects.

When using two or more window shade webs, it is possible to achieve the adjustment in width also without the individual window shade web per se being adjustable in width.

If only one window shade web is used, which is transversely expandable, means are required for pulling the window shade web appropriately wide in the extended state. This can be achieved in the simplest way with the aid of guide rails which extend in a correspondingly contoured way. Expanding means, which run in grooves of the guide rails and pull the window shade web correspondingly wide, are provided for the edges of the window shade material.

The expanding means can be cords, which are present along the entire edge of the window shade web and are provided with a projecting lip. The lip can be hooked behind the undercut edge of a correspondingly shaped groove in order to achieve the desired transverse expansion.

In the course of retracting the window shade web the cord is also wound on the windup roller, for which it appropriately moves out of the guide rollers. In the completely retracted state of the window shade it is sufficient if a short section of the window shade remains guided in the guide rails. In the course of being pulled out, or unwound, the section of the cord seated in the guide rails automatically pulls the still free following section into the guide rails behind itself.

The guide rails can be selectively provided with a single groove for the expanding means and the pull rod, or with two separate grooves, wherein one is provided only for the cord and the other only for the pull rod.

The actuation of the pull rod can take place in any arbitrary manner, such as known from the prior art or from practical experience, for example with the aid of SU flex shafts™, cable pulls, or the like.

In place of guide rails with grooves, rod-shaped guide rails, on which rings slide, which are connected with the edges of the window shade material, can also be used. In this case the stowage device becomes a simple pocket, in which the window shade material is placed in an accordion shape or a fan shape.

Another possibility for stowing the window shade material consists in the use of a windup roller system composed of one or several windup rollers.

If the window shade material is intended to merely extend in a chord-like manner in front of the rear window, a single continuous windup roller is sufficient.

If a curved shape of the window shade material is also desired in the area of the outlet slit, it is practical to compose the windup roller device from two or more individual windup rollers, which are possibly operationally connected with each other. In this case the axes of the windup rollers form angles with each other which are other than 180°, so that the course of the respective window edge can be approximated in the manner of a polygon.

Even when using a single expandable window shade which can be changed in width, there is the possibility of winding the window shade on one or several windup rollers whose angles to each other differ. In this case the individual windup rollers are operationally coupled with each other so that they run synchronously.

When using two or more non-expandable window shade webs, the gap between the individual window shade webs in the extended state can be minimized, if windup rollers which adjoin each other, or are neighbors, have a reversed winding direction. Because of this the window shade webs can directly adjoin each other and no distance corresponding to the diameter of the windup roller is required between them if overlapping is to be achieved.

Actuation becomes particularly simple if a single common pull rod is used for all window shade webs.

The window shade in accordance with the invention can be advantageously pre-assembled in an assembly frame containing the guide rollers and the stowage device, as well as the drive mechanism. Because of this, the entire unit can be mounted as a complete component in the course of the vehicle assembly.

In accordance with a further aspect of the invention, increased user comfort can also be achieved if the window shade has a window shade material which is composed of at least two essentially non-expandable window shade webs, wherein two arbitrary points on the two window shade webs which are located at the same height do not experience a relative distance change during retraction and extension. It is easily possible by means of such a window shade to approximate the bowed shape of the rear window and to bring the window shade webs as close as possible toward the window, regardless of the extent of the curvature of the window.

The window shade webs can be made of a foil which is impervious to light and whose transparency can be fixed in the desired way by perforations.

In this embodiment, two variations can be used as guide means. One variation consists in the use of the known guide rails, in which the ends of the pull rod are guided and on which the transverse edges of at least two window shade webs have been fastened. Since with this embodiment the longitudinal edges of the window shade material are not acted upon by transverse forces, they need not be guided or held in the guide rails. Under these circumstances a solution by means of levers can also be used for extending the window shade web. This provides at least two pivotable toggle levers, which have flexural strength and are pivotally seated at the windup roller and whose other ends are connected slidingly, in the case of the pivot lever, or hingedly, in the case of the toggle lever. Here, too, a pull rod is preferably employed which is common to all window shade webs and whose angle essentially matches the angle at which the windup rollers for the window shade web are arranged in respect to each other.

So that, depending on the special embodiment of the window shades, no creases appear in the extended window shade web, the respective transverse edge of the window shade web is preferably displaceable in respect to the pull rod in the direction parallel to the longitudinal extent of the latter.

With this type of window shade, the stowing means can be a simple pocket, in which the window shade webs are folded and stored, or it can comprise a windup roller system on which the window shade webs are wound.

Suitably the windup roller system is composed of several windup rollers, which are moved synchronously in respect to each other and which are arranged at a defined angle in respect to each other, in order to achieve the polygon-like approximation to the window curvature.

The gap between the window shade webs can be made particularly narrow if the window shade webs overlap each other, to which end the windup rollers are suitably wound in opposite directions. Because of this, the window shade webs can adjoin each other directly without having to maintain a gap between them which corresponds to the wound-up roll on the windup roller.

A particularly good approximation to a strongly curved rear window surface is achieved by means of three window shade webs.

The window shade in accordance with the invention with at least two non-expandable window shade webs can be advantageously pre-assembled in an assembly frame containing the guide rollers and the stowage device, as well as the drive mechanism. Because of this, the entire unit can be mounted as a complete component in the course of the vehicle assembly.

Instead of winding the window shade web directly on the windup roller, there is also the option of attaching pulling means to the rear edge of the window shade web, which are wound on disks, which are appropriately spaced apart from each other. Or, the rear transverse edge is also provided with a pull rod on which a drive mechanism acts.

Finally, a very easy mounting can be achieved if the window shade is pre-fabricated as a mounting unit independently of the type of the window shade material. This mounting unit contains the guide rails, as well as the drive mechanism and the windup rollers and the like. The mounting frame is furthermore provided with fastening means for attachment to the vehicle.

Otherwise, the window shade can be embodied as described above in respect to the windup rollers and further design of the window shade web to the extent that this is technically useful.

Other objects and advantages of the invention will become apparent upon reading the following detailed description and upon reference to the drawings, in which:

Figure 1:
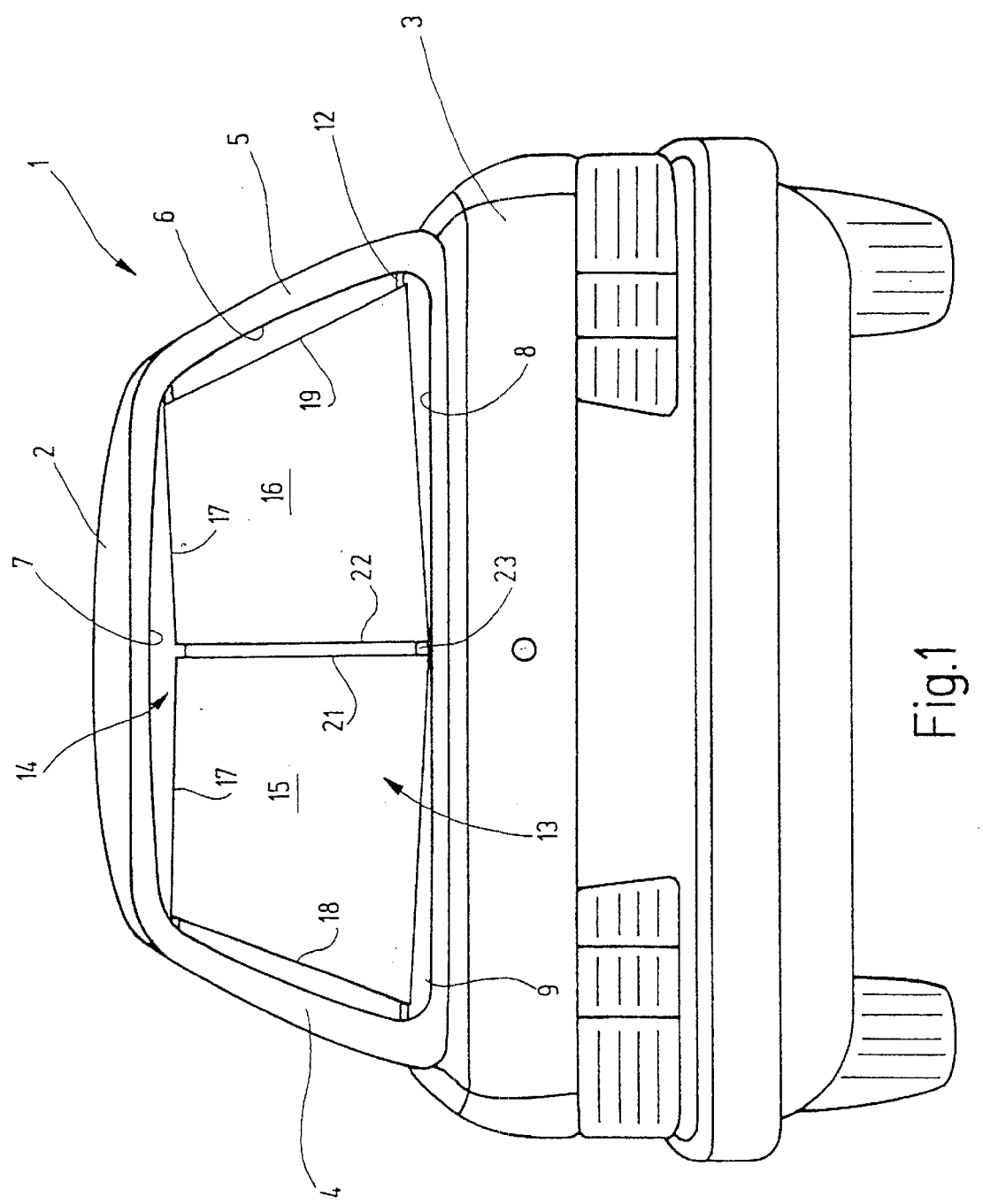
FIG. 1 is a rear view of a motor vehicle with a window shade in accordance with the present invention, shown in an extended or pulled out position.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF PREFERRED EMBODIMENTS

Figure 2:
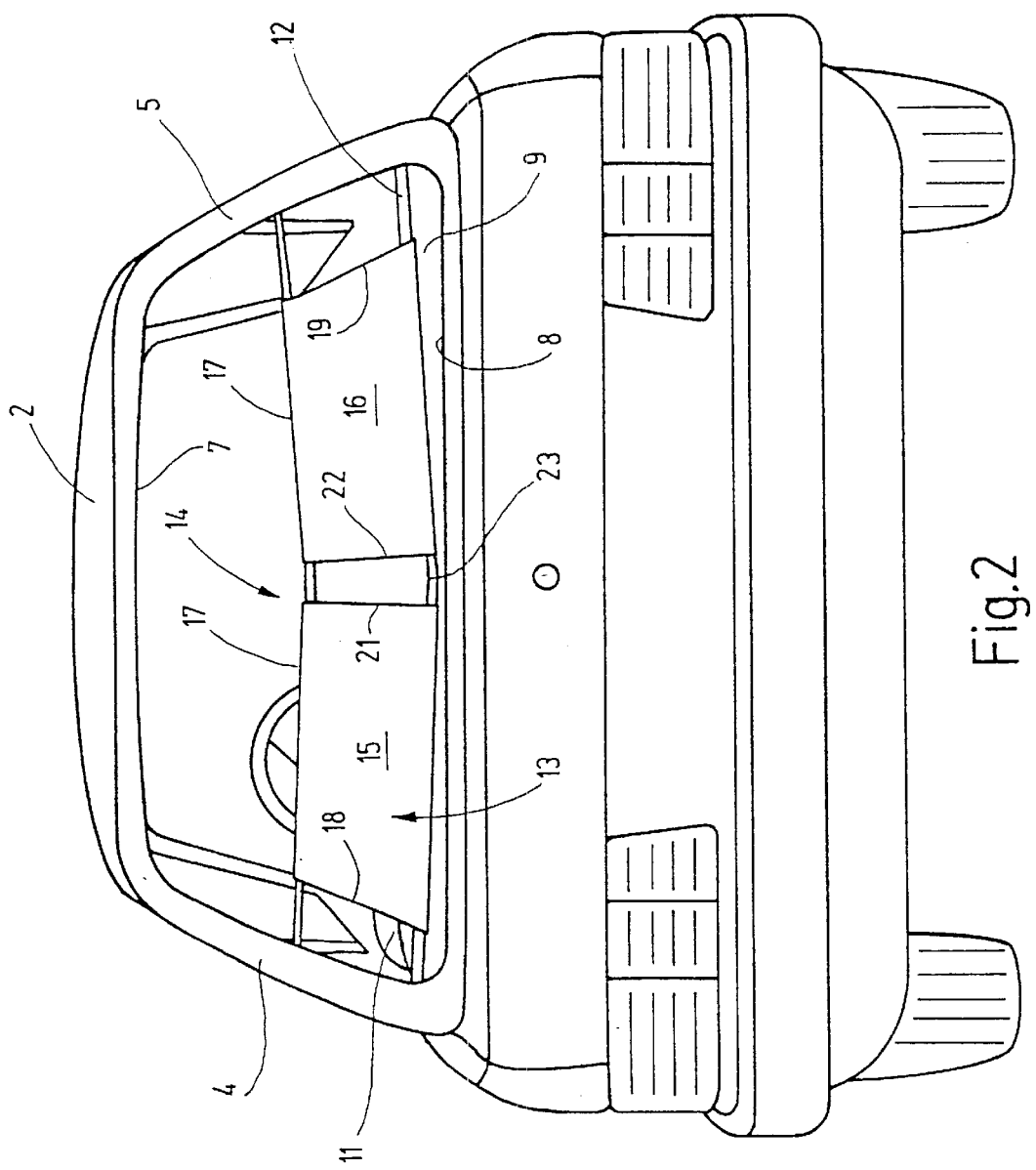
FIG. 2 is a rear view of the motor vehicle, similar to FIG. 1, with the window shade in a partially retracted position.

Now referring more particularly to FIGS. 1–4 of the drawings, there is shown a passenger car 1 having a retractable window shade in accordance with the invention. The passenger car 1 has a roof 2, a trunk 3, and two C-columns 4, 5 depicted schematically in FIG. 1. A rear window opening 6 is located between the two C-columns 4, 5, which is bordered at the top by a rear roof edge 7 and at the bottom by a window ledge 8. A rear window is seated in the rear window opening 6 in a known manner, for example glued in by means of a rubber strip. A rear window shelf 9, which horizontally extends between the lower window edge 8 and the back 11 of a rear seat and which can be partially seen in FIG. 2, is located in the interior of the passenger car 1 in front of the inside of the rear window. An outlet slit 12, which is bent or extends at an angle, runs in the rear window shelf 9.

The outlet slit 12 is a part of a rear window shade 13, whose window shade web material 14 is composed of two non-expandable window shade webs 15, 16. In FIG. 1, the two window shade webs 15, 16 extend upward through the window shade slit 12 until their upper, or transverse edge 17 in the vicinity of the rear roof edge 17. Outer lateral edges 18, 19 of the window shade web material 14, or of the two window shade webs 15, 16, extend nearly parallel with the lateral window edges defined by the two C-columns 4, 5. In the center area, the inner longitudinal edges 21, 22 of the two window shade webs 15, 16 lie very closely together. All longitudinal edges 18 to 22 are straight and not guided.

In the pulled-out or extended state, the two window shade webs 14, 15 extend along a plane, wherein the planes defined by the two window shade webs 15, 16 form an angle with respect to each other in such a way, that a polygonal approximation to the curvature of the rear window takes place. The outlet slit 12 is bent accordingly, i.e. starting at a center location 23, a section of the outlet slit 12 extends on each side in such a way that the two sections form a corresponding angle in respect to each other.

Because of the special installation conditions, the width of the window shade web material 14 changes during the retraction and extension, i.e. two arbitrary points located on the longitudinal edges 18, 19 change their relative distance from each other when the window shade web material 14, starting at the completely retracted position, in which the transverse edge 17 has for all practical purposes disappeared in the outlet slit 12, is changed into the completely extended position, as indicated in FIG. 1. The relative change of the distance during retraction, or extension, which also affects the longitudinal edges 21, 22, becomes visible in the partly extended position in accordance with FIG. 2.

The window shade 13 has the advantage that, even when the rear window is sequentially curved, the window shade web material 14 can be brought relatively close to the window, even though sections of it lie chord-like in front of the inside of the rear window.

Figure 3:
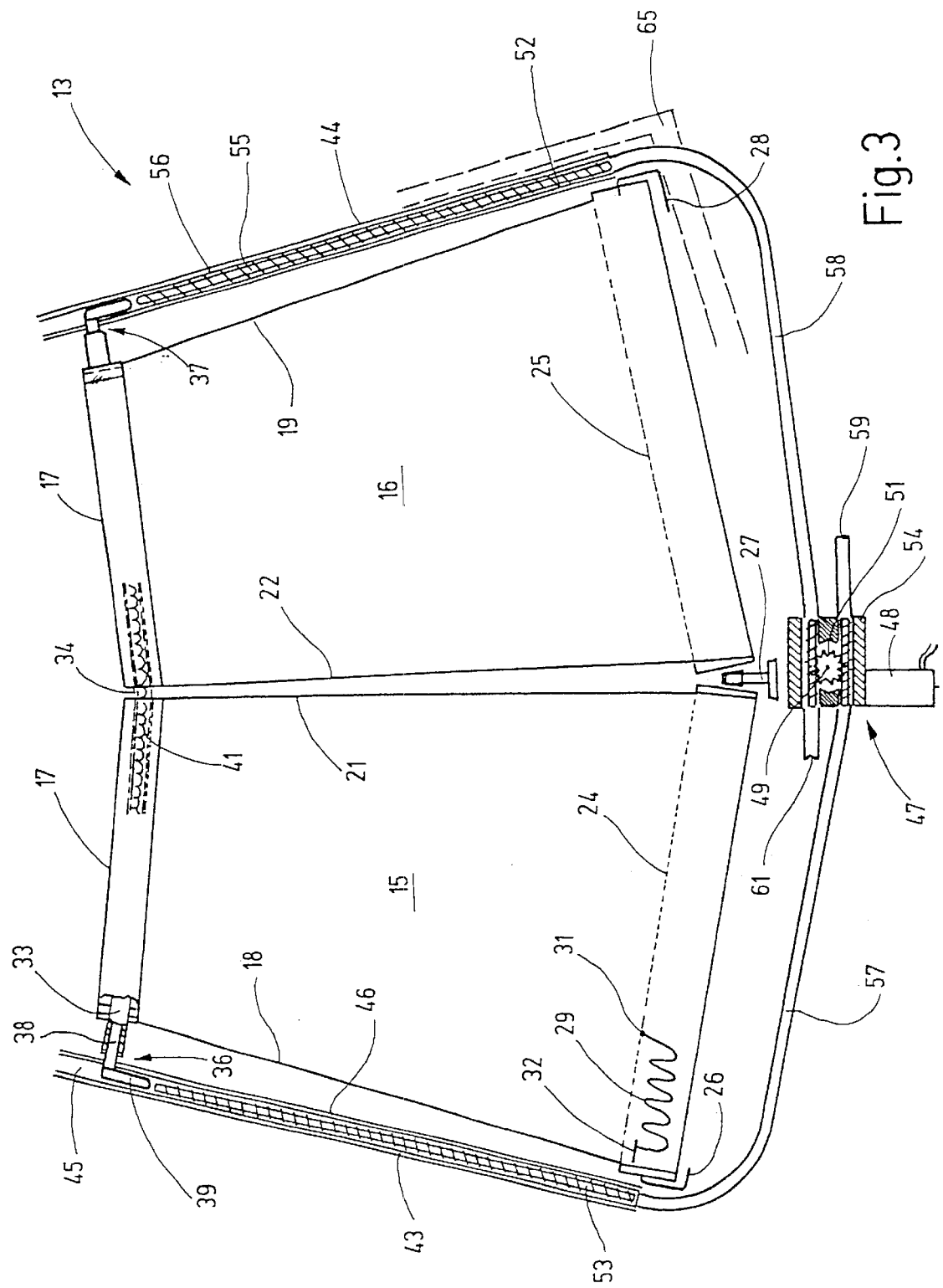
FIG. 3 is an enlarged fragmentary section of the window shade shown in FIG. 1.

The window shade 13, as depicted in FIG. 3, includes two windup rollers 24, 25 which are rotatably seated underneath the window shelf 9. The two windup rollers 24, 25 in this case are rotatably supported in appropriate pedestals 26, 27, 28 fastened to the rear window shelf. Each windup roller 24, 25 consists of a cylindrical tube, within which an interior helical spring 29 is arranged. The helical spring 29 has one end 31 connected to the windup roller 24, while its other end 32 is anchored on a bearing journal, for example, fixedly seated against relative rotation on the pedestal 26. The windup roller 24 is prestressed in the direction of winding the window shade 15 up with the aid of the helical spring 29, which is used as a spring drive. The windup roller 25 is similarly provided with a spring drive.

The two windup rollers 24, 25 are located underneath in parallel relation with the rear window shelf 9 and are arranged at an angle in respect to each other, which corresponds to the desired polygonal approximation to the curvature of the rear window, as schematically seen in FIG. 3.

The window shade web 15 is fastened to the windup roller 24 at its lower transverse edge, which is approximately parallel to the upper transverse edge 17. The same correspondingly applies to the window shade web 16, whose lower transverse edge is also fixed in place on the windup roller 25.

The upper transverse edge 17 of the two window shade webs 15, 16 forms a loop, into which a tube-shaped pull rod 33 has been placed, whose length corresponds to the least width of the rear window and which is angled at 34, so that it extends approximately parallel with the two windup rollers 24 and 25. The tube constituting the pull rod 33 has, for example, an oval cross section wherein the largest axis lies in a direction parallel with the window shade web 15, or 16.

Guide members 36, 37, which are L-shaped, are plugged into the tube 33 from each end. The guide member 36 has a shaft 38, whose cross section is matched to the inside width of the tube 33, so that the shaft 38 is plugged into the tube longitudinally displaceable, but fixed against relative rotation. A guide element 39 extends at approximately right angles with respect to the shaft 38.

The guide member 37 has the same structure, but is mirror-reversed, as the guide member 36. A compression spring 41 lies inside the pull rod 33, whose ends are connected with the shafts 38 of the two guide elements 36, 37. It urges the shafts 38 of the guide members 36, 37 in directions out of the pull rod 33.

C-shaped guide rails 43, 44 extend laterally next to the two longitudinal edges 18, 19. The two guide rails 43, 44 are respectively covered toward the outside by the C-columns 4, 5 and can therefore not be discerned in the two FIGS. 1 and 2.

The guide rail 43 defines an essentially cylindrical inner chamber 45 which opens toward the exterior via a slit 46. The inner chamber 45 and the guide element 39 are matched to each other in such a way that the guide element 39 can slide inside the inner chamber 45 without jamming, while the shaft 38 projects outward through the slit 46.

Because of the angled orientation of the guide element 39 together with the oval shape of the pull rod 33, the pull rod 33 is maintained in a spatial position in such a way that, in spite of the angle 34, the pull rod 33 defines a plane which always remains approximately parallel with the plane defined by the rear window shelf 9. The compression spring 41 pushes the two guide members 36, 37 outwardly. They rest with a prestressing force acting against the side of the inner chamber 45 which lies opposite the slit 46. The guide rail 44 has a similar cross-sectional shape as the guide rail 43.

In the position of rest of the window shade 13, the two window shade webs 15, 16 have been wound on the associated windup rollers 24, 25. To unwind the window shade webs 15, 16 from the windup rollers 24, 25, a further drive mechanism in the form of a gear motor 47 is provided, part of which is a d.c. motor 48, which can be selectively operated through the on-board electrical system of the vehicle 1. An output gear wheel 51 is seated on the output shaft 49 of the gear motor and is in engagement with two SU flex shafts™ 52, 53, which lead through corresponding guide conduits in the gear housing 54 tangentially at the opposite sides of the gear wheel 51. An SU flex shaft™, as is known in the art, is composed of an essentially cylindrical flexible core 53, for example in the form of a flexible cord, and a wire helix 56 fastened on it, which constitutes a single- or multi-turn winding. A flexible toothed rod with helical toothing is obtained in this way, which can be moved in the axial direction by the gear wheel 51.

A first guide tube 57 leads from the gear motor 47 to the lower end of the straight guide rail 43, while a second guide tube 58 connects the gear motor with the lower end of the straight guide rail 44. The flexible SU flex shafts™ 52, 53 extend through the two guide tubes 57, 58. Storage tubes 59, 61, represented in a cut-off manner, are connected on the respectively opposite side, in which the pushed-back portion of the SU flex shafts™ 52, 53 are protectively stored when the window shade 13 has been fully retracted.

To explain the function, it is assumed that the window shade 13 is completely extended, as shown in FIG. 3. For this purpose, the gear motor 47 has been previously put in motion, because of which the two SU flex shafts™ 52, 53 are pushed forward into the inner chambers 45 of the two guide rails 43 and 44. The respectively free ends of the two SU flex shafts™ 52, 53 meet the lower ends of the guide elements 39 flush, and thereby they have pushed the two guide members 36, 37 upward in the direction toward the lower roof edge 7, i.e. the upper window edge of the rear window. In the course of the forward movement, the window shade webs 15, 16 were unwound from the associated windup roller 24, 25 against the effects of the spring drives 29. The gear motor 47 in this case has an automatic interlock so that the position of the SU flex shafts™ 52, 53 reached when the gear motor 47 is switched off is retained.

For retracting the window shade 13, the gear motor 47 is started in the reversed direction of rotation. In the course of the cooperation of the gear wheel 51 and the wire helix 56 on the cores 55 of the two SU flex shafts™ 52, 53, the latter are pulled back out of the two guide rails 43, 44 and pushed into the associated storage tubes 59, 61. Because a constant force acts on the window shade webs 15, 16 on account of the spring drives 29, which pull the upper transverse edge 17 in the direction toward the windup rollers 24, 15, the upper transverse edge 17 will move downwardly to the extent that the retreating SU flex shafts™ 52, 53 permit this.

In the course of the retraction, the distance between the two guide rails 43, 44 changes, which influences the pull rod 33. The two guide members 36, 37, whose shafts 38 are guided in a longitudinally displaceable manner in the pull rod 33, are pushed outward, assisted by the compression spring 41, in order to absorb the distance change. The use of a compression spring is advantageous because it permits, together with the orientation of the guide rails 43, 44, a force to be created in the direction toward the windup rollers 24, 25, and in this way assists the effect of the spring drives 29. Because the distance between the longitudinal edges 21, 22 simultaneously changes during retraction, the transverse edges 17, embodied as loops, of the two window shade webs 15, 16 slide axially outward on the pull rod 33.

It will be understood that the arrangement is self-centering to a large extent, because the two guide members 36, 37 are only prestressed against each other, but not against the pull rod 33. This centering can be improved if the loops of the window shade webs 15, 16 are not directly pushed on the pull rod 33, but if a sliding sleeve is interposed.

The guide rails 43, 44, as well as the gear motor 47 and the pedestals 26, 27, 28 for the windup rollers 24, 25, can be attached together via an appropriate mounting frame 65. A pre-assembled unit is obtained in this way, which can be mounted as one piece in the body of the vehicle 1. With a pre-assembled rear window structure it is no longer necessary during the assembly of the vehicle on a conveyor to mount the parts individually in the vehicle. The entire mounting frame 65, in which the mentioned elements have been installed ready for operation, is schematically illustrated in FIG. 3. Its particular shape is a function of the respective installation conditions in the motor vehicle 1.

Figure 4:
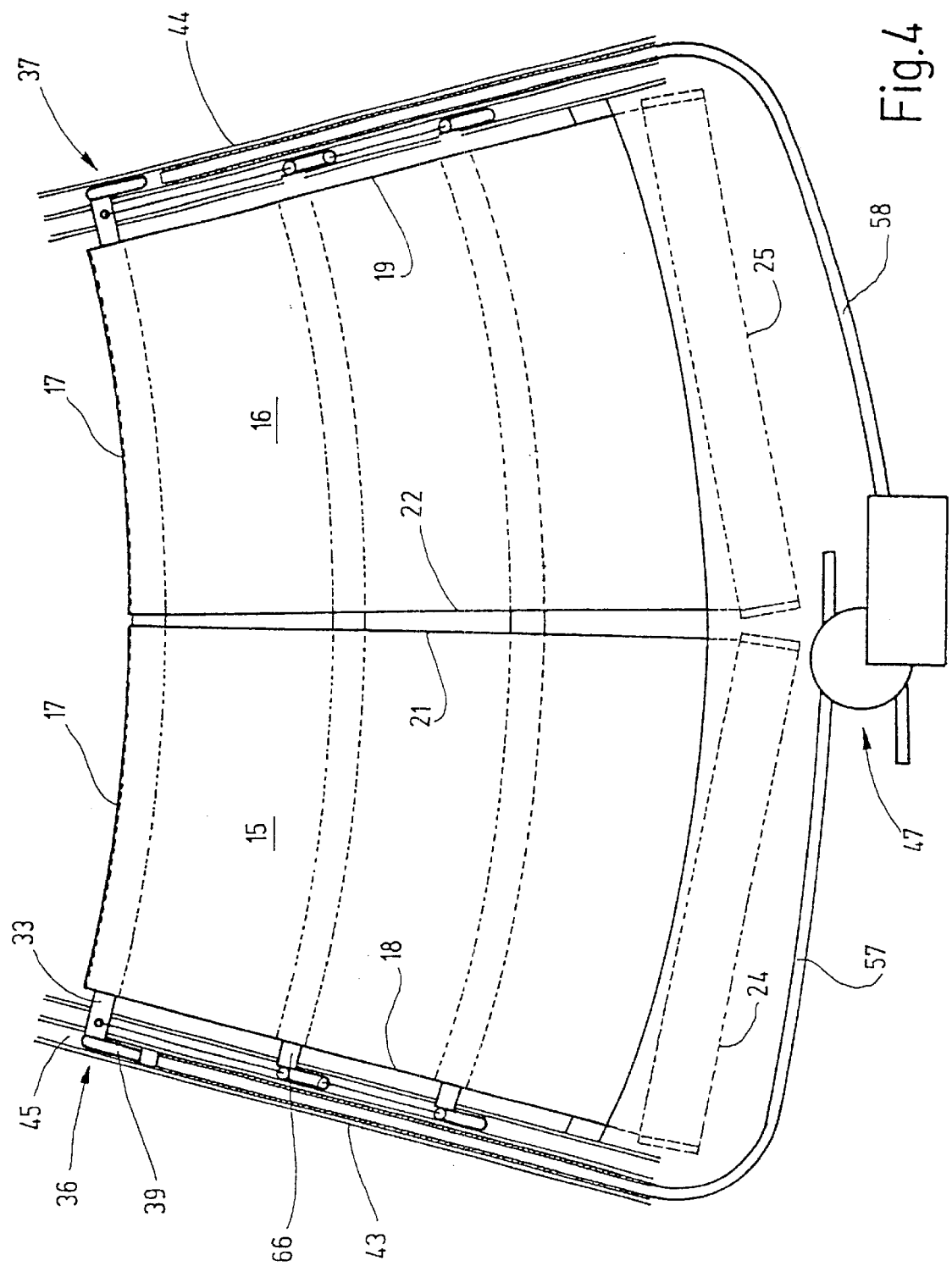
FIG. 4 is a fragmentary section of a window shade, similar to FIG. 3, but with additional immediate support bows.

FIG. 4 schematically shows a window shade 13 of a similar design as the window shade in FIG. 2, wherein only additional bows 66 have been added, which have been set in associated hose-shaped pockets of the window shade webs 15, 16. The bows 66 have a structure similar to the one already described in connection with the pull rod 33. So that the guide parts of the guide members 36, 37 cannot collide with the similarly guided bow ends 66, the respective guide rail 43, 44 in this instance contains a second guide groove in which the bows 66 are guided.

Window shade webs are employed in connection with the two previously explained exemplary embodiments which, per se, are non-changeable in width, i.e. they are essentially inelastic in both axes. However, the width nevertheless changes during retraction and extension, i.e. the distance that points of the window shade web, which are located at the same height, are from each other. In the illustrated embodiment, the distance becomes greater in the course of retraction. Such a situation occurs if the windup rollers define a plane having an angle in respect to the surface of the rear window which differs from 90°, and the window shade is located in front of a curved window.

Even if the windup rollers are arranged at an angle with respect to each other in order to polygonally approximate a curvature, but the window extends essentially vertically in respect to the plane defined by the windup roller, the center longitudinal edges 21, 22 extend at right angles in respect to the windup rollers, so that no change in width occurs during retraction or extension. Such conditions can be found, for example, in connection with station wagons. The structure required for this is essentially the same as the structure described for a rear window of a sedan.

Figure 5:
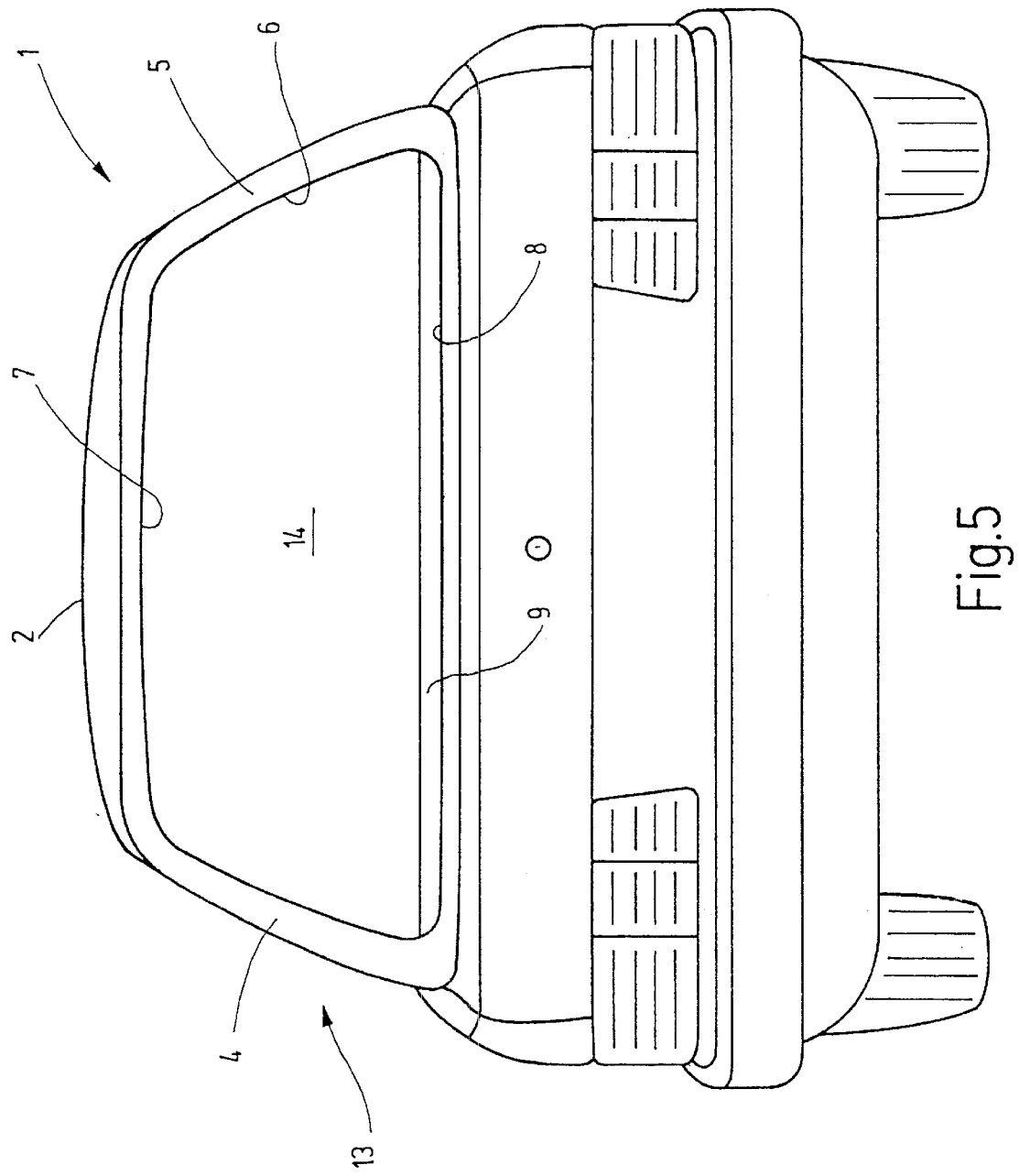
FIG. 5 is a rear view of a motor vehicle having a window shade housed within the roof of the vehicle, with the window shade shown in an extended position.
Figure 6:
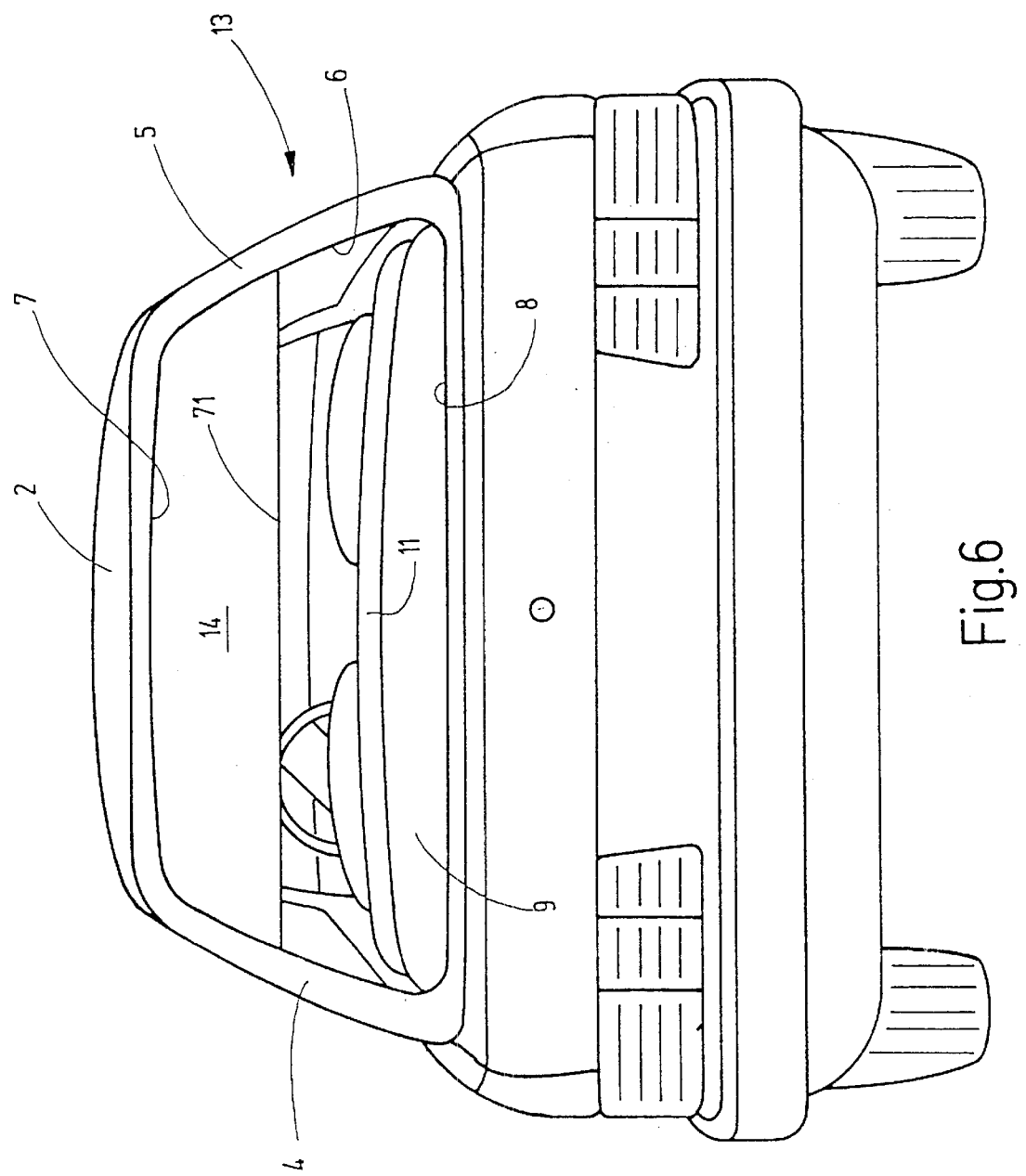
FIG. 6 is a rear view of the motor vehicle shown in FIG. 5, with the window shade shown in a partially retracted position.

A rear window shade 13 is represented in FIGS. 5 and 6, whose window shade material 14 is stowed in the hollow space of the roof 2 when not in use. FIG. 5 shows the complete shading of the rear window by the window shade material 14, while in FIG. 6 the window shade 13 is partially retracted and a lower edge 71 extends approximately parallel with the center of the rear window.

Figure 7:
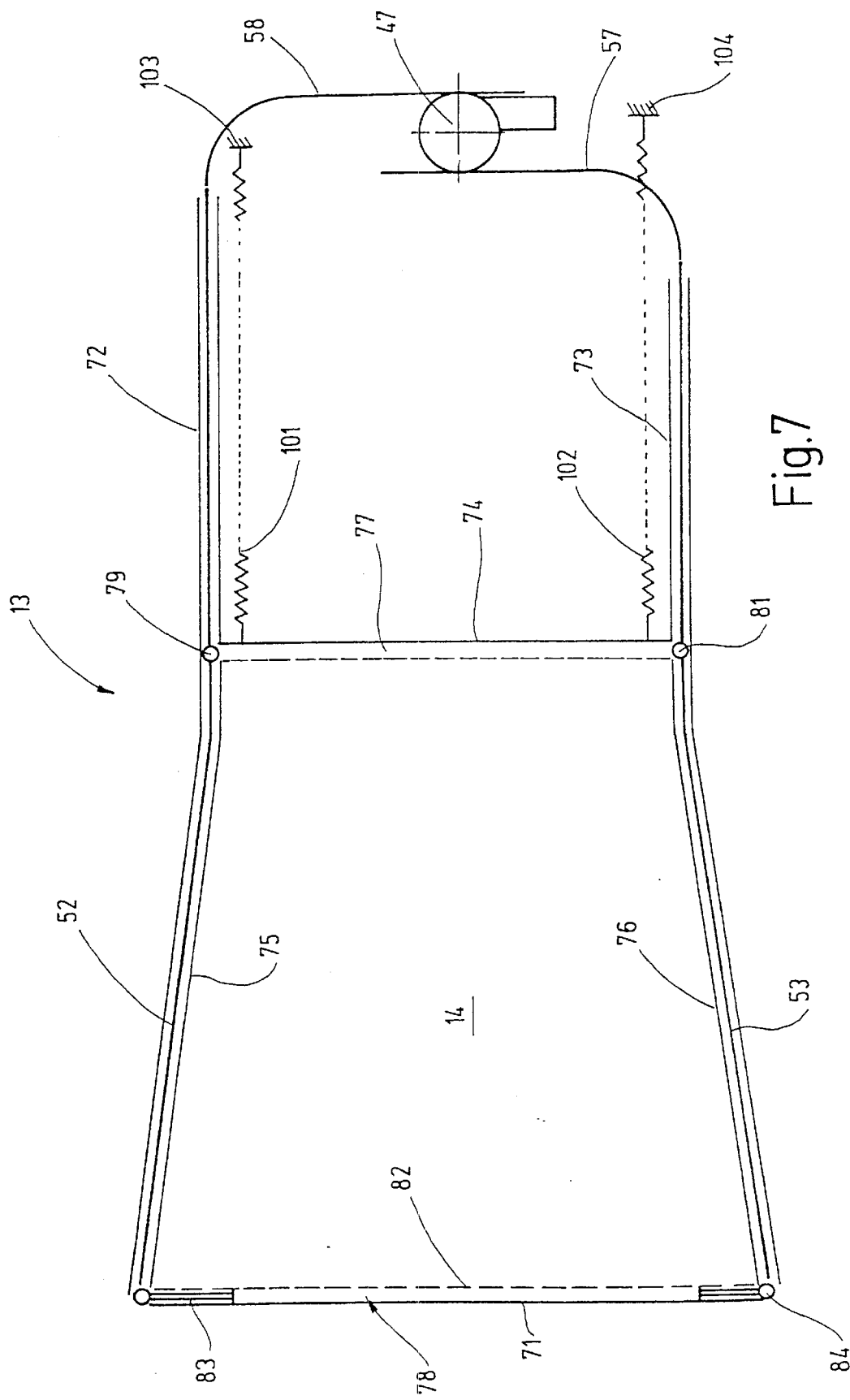
FIG. 7 is an enlarged fragmentary view of the window shade shown in FIG. 5, with the window shade oriented horizontally in FIG. 7 for purposes of illustration.

The structure of the window shade 13 for the arrangement in accordance with FIGS. 5 and 6 is represented in FIG. 7. The roofs of motor vehicles are known to contain a hollow space, which is bordered on the side toward the passengers by the headliner and towards the exterior by the sheet metal skin of the body. Two guide rails 72, 73 extend parallel with each other in this hollow space and emerge in the area of the rear edge of the roof out of the headliner through a window shade slit contained in the headliner, and extend there laterally next to the edges of the rear window in the direction toward the rear window shelf 9. As shown in FIG. 7, they make a transition from their parallel arrangement into a diverging arrangement at the place of the outlet from the roof interior and are simultaneously bent downward in respect to the roof in a manner corresponding to the angular position of the rear window. The window shade web 14 is guided between these two guide rails 72, 73. In this exemplary embodiment, the widow shade web 14 is made of a mesh material, i.e. from a knit material, such as shown in part in FIG. 9 at A.

A knit material is known to have the property of being expandable in both axial directions. The mesh material has this property because of the mesh structure, since in a mesh structure there are no threads which extend through it, such as in a woven material. Instead, the threads of the mesh material are arranged in a known meander shape, wherein the loops of the meander represent the mesh. Such a textile shape can be expanded in width as well as in length. The bending elasticity inherent in the threads permits the mesh material to return to a large extent into its original position when relaxed.

An increased restoring force can be achieved in that elastomer threads, for example threads commercially available under the name "Elastan™," are employed in addition to the non-expandable threads. A thread proportion of maximally 6% is sufficient for causing a sufficient restoring force. Here, the mesh material is preferably produced in the form of a plated material, so that the elastomer threads are exclusively located on one side of the web material, for example on the side toward the interior of the vehicle. By means of such arrangement the elastomer threads are shielded to a large extent against UV radiation. An elastomeric foil which is evenly perforated can also be used in place of the mesh material. Such a structure is partially shown in FIG. 9 at B.

The window shade web 14 is bordered by a front transverse edge 74, which always remains in the roof interior, a lower or rear edge 71, which extends approximately parallel with the edge 74, as well as two longitudinal edges 75 and 76. Pull rods 77, 78 are provided at the transverse edge 71, as well as on the transverse edge 74. These pull rods 77, 78 have been placed in a known manner into hose-shaped pockets formed on the transverse edges 71, 74. The pull rod 77, which is schematically indicated by the dashed line, is non-changeable in length and terminates in two end pieces 79, 81, which are provided with a through bore.

The pull rod 78 is composed of a center piece 82 of fixed length, as well as two movable end pieces 83, 84, which are guided in a longitudinally displaceable manner in the tube-shaped center piece 82. The shape of the respective end pieces 83, 94 will be explained in what follows in connection with FIG. 8, which also illustrates the cross-sectional profile of the guide rails 72 and 73.

The end pieces 82, or 83, each are composed of a cylindrical shaft 85 and a ball-shaped head 86 embodied on a free end. A first guide groove 87 in the guide rail 72, or 73, is matched to this shape. Accordingly, it consists of a parallel-flanked section 88, which makes a transition into a cylindrical space 89 in the interior of the guide rail 72 or 73. A further groove 91 runs parallel with the groove 87. This further groove 91 forms a parallel-flanked section 92, which extends parallel with the groove 82 and opens to the same side, namely a periphery 93. In the interior of the guide rail 72, or 73, the section 92 makes a transition into a section 94 of a triangular shape, so that a shoulder 95 is created, which extends parallel with the periphery 93 and lies at right angles in respect to the section 92. It extends uninterrupted over the length of the respective guide rail 72, 73.

A cord 91, which is sewn together with the respective longitudinal edge 75, or 76, of the window shade web 14, runs in the groove 91. The length of the cord 96 corresponds to the length of the respective longitudinal edge. The cord 91 is composed of a first ribbon-shaped section 97, which makes a transition into a second ribbon-shaped section 98 on the other side of the edge 75, or 76. The ribbon-shaped section 98 forms a lip or strip which, in the relaxed state shown in FIG. 8, extends obliquely in respect to the ribbon-shaped section 97. The two sections 97, 98 form a V, whose tip projects into the groove 91, while the lip or strip 98 is embodied for acting together with the shoulder 95. The cord 96 consists of a resilient elastic material, so that the strip 98 can be flipped flat on the section 97.

Figure 8:
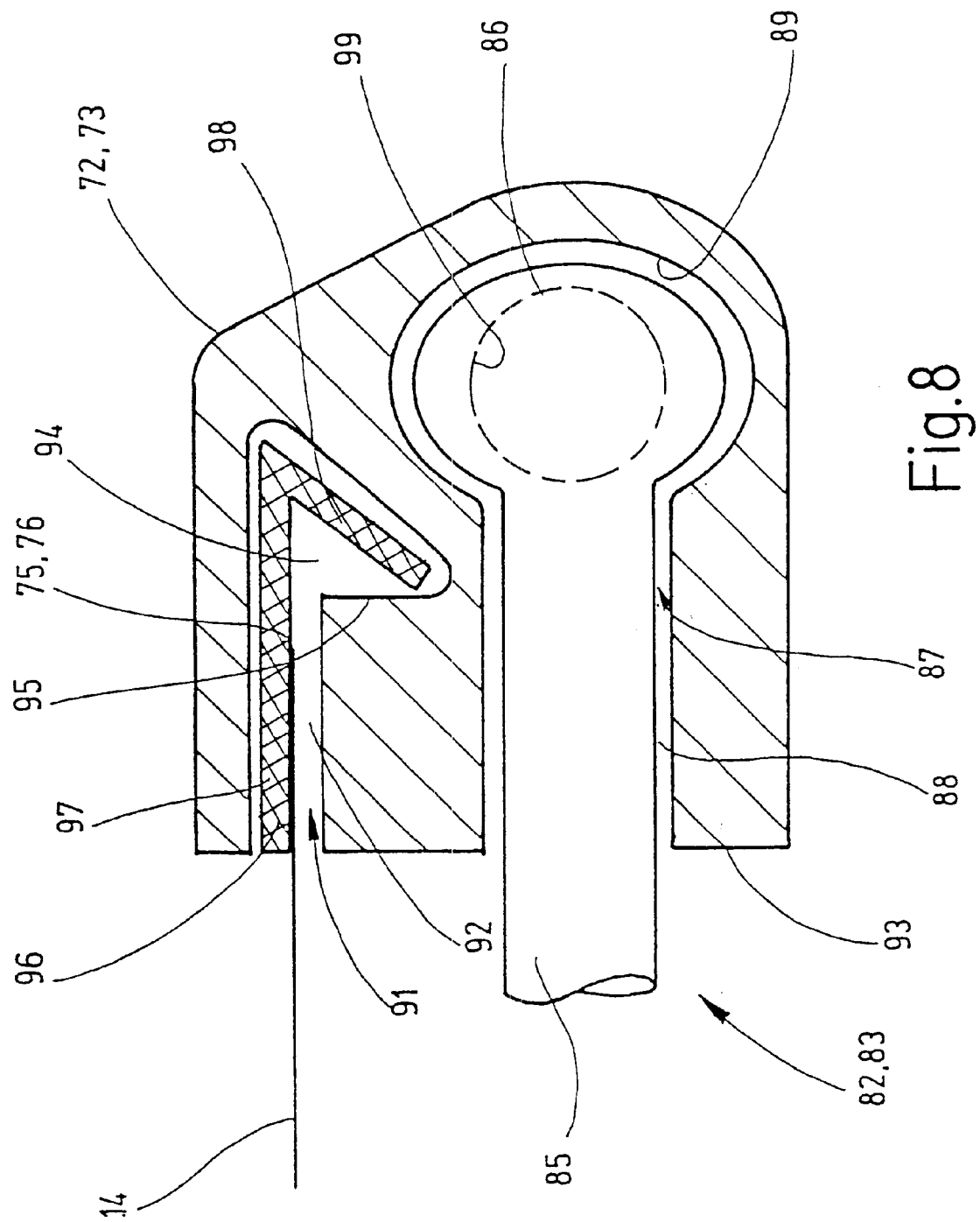
FIG. 8 is a fragmentary section of the guide rail for the window shade shown in FIG. 7.

The end pieces 79, 81 of the pull rod 77 basically have the same shape with only the difference that the ball-shaped head 86 is provided with a bore 99, which is drawn in dotted lines in FIG. 8.

For moving the window shade web 14, a gear motor 47 again is provided, which drives two associated SU flex shafts™ 52, 53. The SU flex shafts™ 52, 53 extend in the cylindrical section 89 of the groove 97. They lead through the bore 99 of the end pieces 79, 81 and end flush against the ball-shaped heads of the end pieces 83, 84.

Guide tubes 57, 58 each extend from the gear motor 47, which guide the SU flex shafts™ 52, 53 from the gear motor to the end, located in the roof interior, of the two guide rails 72, 73.

To retract the window shade web 14 into the roof space, two spring-elastic pulling means 101, 102, for example rubber bands, are provided, one end of which is connected with the transverse edge 74, or with the pull rod 77, and the other end is anchored in the roof interior at 104 and 103.

The window shade 13 so far described functions at follows:

In the retracted state the window shade web 14 essentially lies between the two parallel extending sections of the two guide rails 72, 73. As previously described, this part is essentially located in the roof space between the outer skin of the roof and the headliner.

The lower or rear transverse edge 71 has been retracted closely behind the window shade slit formed in the headliner. The lateral edges of the window shade web 14 are guided and held in the associated groove 91 with the aid of the cord 96.

To extend the window shade web 14 for reaching the position in accordance with FIG. 5, the gear motor 47 is switched on, which thereupon pushes the associated SU flex shafts™ 52, 53 in the direction toward the lower ends of the two guide rails 72, 73. In the course of this movement the SU flex shafts™ 52, 53 abutting on the ball-shaped heads take along the rear, or lower, pull rod 78, which then pulls the widow shade web 14 out of the roof interior and moves the lower transverse edge 71 of the latter in the direction toward the rear window ledge 9. In the process, the window shade web 14, which is elastic in the transverse direction, is expanded, because the cords 96, which are continuously fastened on the longitudinal edges 75, 76, continue to be caught with the lip 98 in the groove 91. They act as expansion means.

The gear motor 47 is put into operation in the opposite direction for retraction, and the SU flex shafts™ 52, 53 are pulled back in the guide rails 72 and 73. The pulling means 101 and 102 acting on the rear transverse edge 74 then can pull the window shade web 14 back into the roof space. The pulling means 101, 102 cause the window shade web 14 to remain taut in the longitudinal direction in every operating position.

Since there is almost no change in the distance between the two transverse edges 71, 74 during the back and forth movement between the retracted and the extended state, the SU flex shafts™ 52, 53 can also act on the end pieces 81, 79 which, for this purpose, are not equipped with bores. Instead, the distance between the end piece 79 and the end piece 83, or between the end pieces 81 and 84, is generated by an appropriate elastic member, which is rigid and can be pushed, inserted into the cylindrical section 89 of the guide groove 87. This arrangement has the advantage that the elastic pulling means 101 or 102 can be omitted. Instead, the window shade web is pushed back and forth with the aid of an interlocking connection of the SU flex shafts™ 52, 53 with the associated end pieces 79, 81.

With the exemplary embodiment of FIG. 7, the guide rails 72, 73, together with the gear motor 47, can also be pre-assembled ready for operation in a mounting frame in order to make the installation in the vehicle on the assembly line easier.

Instead of maintaining the window shade web 14 continuously expanded, as illustrated in FIG. 7, there is also the option of winding the window shade web on a windup roller in the stowed state, as is basically known in connection with window shades of motor vehicles and is also shown by way of example in FIGS. 3 and 4 in connection with a divided windup roller.

Figure 9:
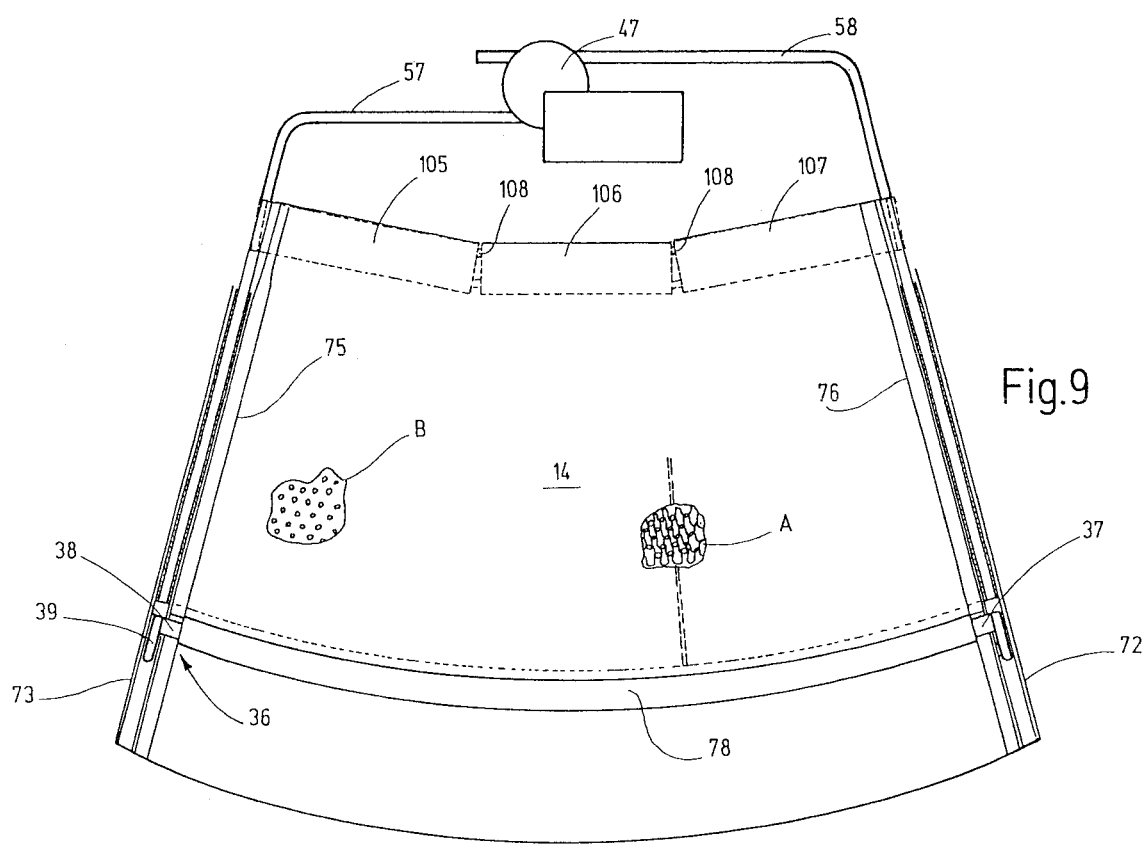
FIG. 9 shows an alternative arrangement of windup rollers for a window shade housed in the roof of the vehicle.

Since customarily the roof of a motor vehicle is curved significantly, there are difficulties in housing a long straight windup roller. A solution in accordance with FIG. 9 is offered in this case. Here, the windup roller device is composed of a total of three windup rollers 105, 106 and 107, which are rotatably seated in a known manner in the roof space. Their axes are oriented in such a way that they polygonally approximate the roof curvature, as indicated in FIG. 9.

As schematically illustrated in FIG. 9, the spatial direction in respect to the plane of the expanded window shade web 14 has been turned for showing the position of the windup rollers 105 to 107 in respect to each other. In actuality, the windup rollers 105 to 107 define a plane which, in respect to the plane defined by the extended window shade web, extends at an angle which is greater by 90° than the external angle measured between the plane of the roof and the plane of rear window.

The windup rollers 105 to 107 are arranged in such a way that their axes of rotation intersect. They are connected with each other by appropriate angular engagement pieces 108 of a known type which permits the rollers to be simultaneously driven. At least one of the windup rollers 105 to 107 is equipped with a spring drive similar to the spring drive 29 in FIG. 3 in order to prestress all windup rollers 105 to 107 in the windup direction of the window shade web 14.

As in the embodiment shown in FIG. 7, the window shade web 14 consists of a mesh material or a perforated foil and is provided on both its lateral edges 75, 76 with a continuous cord 96. The lateral guide rollers 72, 73 have the cross-sectional profile represented in FIG. 8. The pull rod 78 at the lower, or rear, edge is embodied in accordance with FIG. 3.

During retraction of the window shade 13 in accordance with FIG. 9, the window shade web 14 is wound on the group of windup rollers 105 to 107, which is curved in the form of an arc. In the process, the cords 96 fastened on the longitudinal edges 75, 76 correspondingly move out of the respective guide groove 91 and are also wound on the windup rollers 105, 107. The strip 98 is placed flat on the section 97 here.

Even in the completely retracted state, a short section of the two cords 96 remains in the guide rails 72, 73, which otherwise terminate at a short distance form the outside-located ends of the two windup rollers 105 and 107. During the extension, the remainder of the cords 96 in the guide rails 72, 73 causes the previously wound up portion of the respective cord 96 again return into the appropriate guide groove 91 in order to expand the window shade web 14 in the transverse direction, as represented in FIG. 9. Otherwise, the drive of the window shade web 14 takes place in the same way as already explained in connection with the exemplary embodiment of FIG. 3. The use of a mounting frame similar to the mounting frame in accordance with FIG. 3 is also possible with the exemplary embodiment in accordance with FIG. 9.

Figure 10:
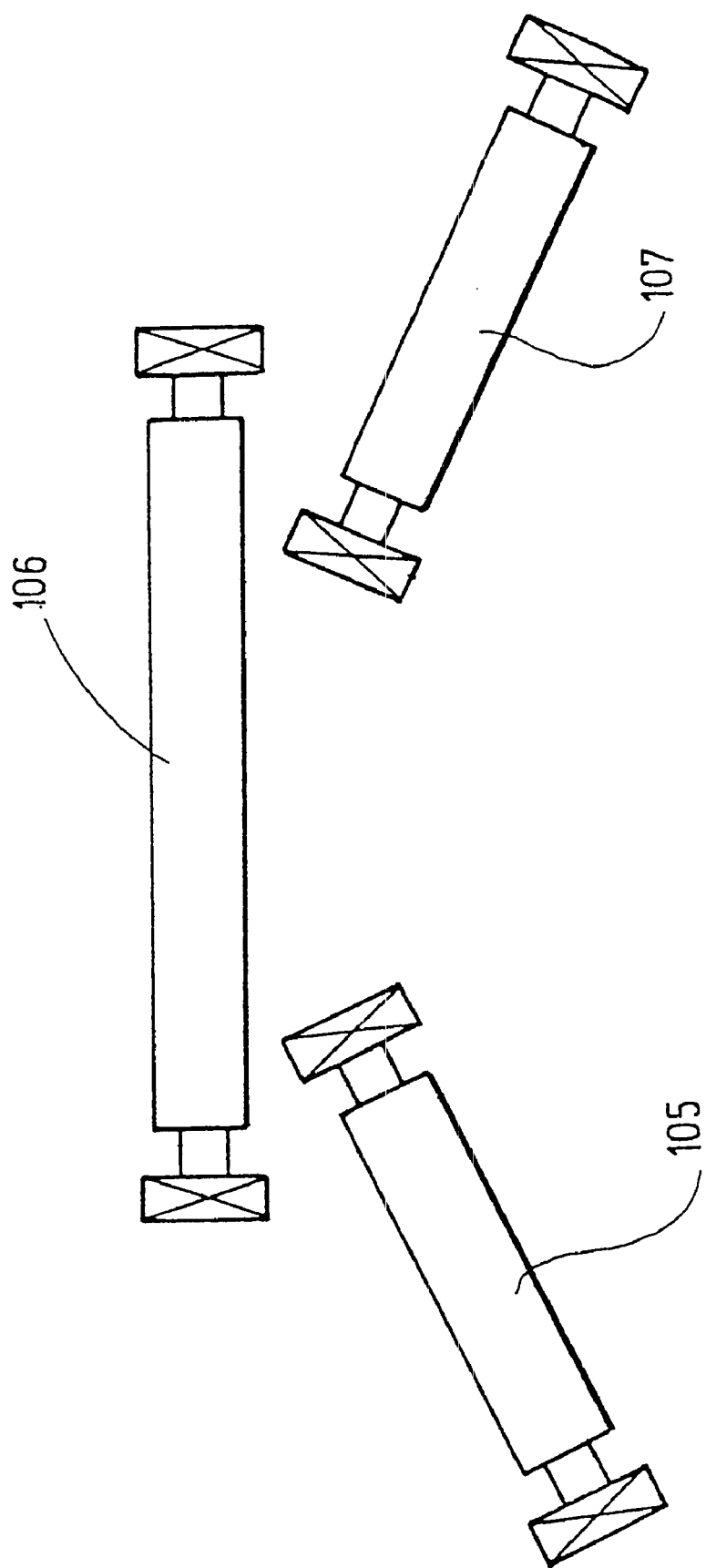
FIG. 10 shows an alternative arrangement of windup rollers.

When the window shade web material 14 is composed of a total of three webs, a particularly good overlap is achieved if the associated windup rollers 105, 106 and 107 in accordance with FIG. 10 wind the associated window shade web in the opposite winding direction. This is intended to be illustrated in FIG. 10 by the wide bar at the side of the respective windup rollers 105 to 107.

A window shade for motor vehicles has a window shade web material 14 which is designed for being adapted during retraction and extension to the shape of the window, namely in respect to the width dimensions and/or in respect to the curvature. To this end, the window shade web material 14 is made either from a window shade web which can be expanded or stretched in the transverse direction, or from two or more non-expandable window shade webs 15, 16 which, in the extended state, approximate the shape of the respective window in the desired manner. An additional mounting frame 65 can be used in all cases, in which the elements which are parts of the window shade are arranged, or stored, in order to create a component in this way, which can be installed as a whole in the vehicle on the assembly line.

What is claimed is:

1. A window shade (13) for motor vehicles which can be retracted and extended along an actuation path, comprising:
   a window shade web (14), which is bordered by two longitudinal edges (18, 19, 75, 76) extending generally in the direction of the actuation path and two transverse edges (17, 71, 74), one of which forms a free edge (17, 71) that moves along the actuation path in the course of retraction and extension,
   a drive (29, 47) for moving the window shade web (14) along said actuation path between extended and retracted positions;
   a stowing device (24, 25, 105, 106, 107) for stowing the retracted window shade web (14) when in said retracted position,
   said web being made of an elastic, stretchable and contractible material which as an incident to movement of the window shade web in one direction along said actuation path is stretched in a direction transverse to the longitudinal edges for increasing the transverse width of the web and as an incident to movement of the web in an opposite direction along an actuation path is contracted to reduce the transverse width of the web,
   at least two guide rails (43, 44, 72, 73) whose distance between each other changes along said actuation path for changing width of the window shade web (14) in response to movement of the web in the direction of said actuation path,
   said guide rails (43, 44, 72, 73) each defining an associated first groove (91) having a relatively narrow width groove slit (92) communicating with a relatively larger interior cavity (94) that defines a shoulder (95), and
   said window shade material (14) including pulling members (96) on its longitudinal edges (18, 19, 75, 76) which are guided in said first grooves (91) and are designed such that they extend behind the shoulder (95) in order to generate a pulling force transversely to said first grooves (91) on the window shade web material (14) in response to movement along said actuation path.

2. The window shade according to claim 1 which said longitudinal edges (18, 19, 75, 76) of said window shade web extend at an acute angle to the actuation path.

3. The window shade according to claim 1 in which said window shade web (14) consists of a material which can only be expanded in width.

4. The window shade according to claim 1 in which said window shade web (14) consists of an elastically expandable foil.

5. The window shade according to claim 4 in which said foil is perforated.

6. The window shade according to claim 1 in which said window shade web material consists of a mesh material.

7. The window shade according to claim 6 in which said mesh material includes at least one non-expandable thread material and at least one elastically expandable thread material.

8. The window shade according to claim 1 in which said window shade web material (14) constitutes a single window shade web.

9. The window shade of according to claim 1 including a pull rod (33) guided by said guide rails (43, 44, 72, 73) and whose length is adjustable in response to movement of said window shade web material along said actuation path.

10. The window shade according to claim 1 in which said pulley members (96) includes a cord which is fastened on a respective longitudinal edge (18, 19, 75, 76) and extends over the length of the longitudinal edge (18, 19, 75, 76).

11. The window shade according to claim 10 in which said cord (96) includes at least one elastically projecting strip (98) that extends over the length of the cord (96).

12. The window shade according to claim 1 in which each said guide rails (43, 44, 72, 73) defines a further groove (87) which extends parallel with the first groove (91) of the pulley members (96).

13. The window shade according to claim 1 including a rotatably mounted windup roller device (24, 25, 105, 106, 107) on which a transverse edge of the window shade material (14) is fastened.

14. The window shade according to claim 13 in which the windup roller device (24, 25, 105, 106, 107) includes at least two windup rollers, each one of which is separately rotatably mounted.

15. The window shade according to claim 14 in which each said windup roller (24, 25, 105, 106, 107) has a drive mechanism (29).

16. The window shade according to claim 14 in which said windup roller (24, 25, 105, 106, 107) have a common drive mechanism (29).

17. The window shade according to claim 14 in which said windup rollers (24, 25, 105, 106, 107) have opposite directions of winding.

18. The window shade according to claim 14 in which the axes of rotation of said windup rollers (24, 25, 105, 106, 107) are oriented at an angle to each other which differs from 180°.

19. The window shade according to claim 14 in which said window shade web material (14) is constituted by a single window shade web, which is wound on several windup rollers (24, 25, 105, 106, 107), whose axes of rotation are oriented at an angle to each other, which differs from 180°.

20. The window shade according to claim 14 in which said window shade web material (14) is constituted by at least three window shade webs, each of which is wound on an associated windup roller (105, 106, 107), wherein the winding direction of the center windup roller (106) differs from the winding direction of the other two windup rollers (105, 107).

21. The window shade according to claim 13 in which said drive comprises at least one spring (29, 101, 102) and at least one electric motor (47), wherein the electric motor (47) is coupled to one of the windup roller device (24, 25, 105, 106, 107) and pull rod (77) and the spring (29, 21) is coupled tote other of said windup roller device and pull rod.

22. The window shade according to claim 13 including a mounting frame (65) on which the windup roller device (24, 25, 105, 106, 107) is seated and which supports guides (43, 44, 72, 73) for the window shade web material as well as said drive (47, 29, 101, 102) such that the window shade (13) can be mounted in the vehicle as a unit.

* * * * *